United States Patent
Sevey (10) Patent No.: US 7,398,637 B1
(45) Date of Patent: Jul. 15, 2008

(54) ACCESSORY MOUNTING SYSTEM FOR A RIDING LAWNMOWER

(75) Inventor: Douglas L. Sevey, Waterloo, IA (US)

(73) Assignee: Recker Industries, Inc., Peosta, IA (US)

( * ) Notice: Subject to any disclaimer, the term of this patent is extended or adjusted under 35 U.S.C. 154(b) by 0 days.

(21) Appl. No.: 10/774,832

(22) Filed: Feb. 9, 2004

Related U.S. Application Data (60) Provisional application No. 60/446,220, filed on Feb. 10, 2003.

(51) Int. Cl.
*A01D 34/00* (2006.01)

(52) U.S. Cl. .......................................... 56/14.9; 56/12.7

(58) Field of Classification Search ................. 56/12.7, 56/16.9, DIG. 9, 14.7, 14.9, 15.3, 15.9; 172/624.5, 172/13; 144/335, 336, 24.12, 34.1; 37/268, 37/409, 443

See application file for complete search history.

(56) References Cited

U.S. PATENT DOCUMENTS

| | | | | |
|---|---|---|---|---|
| 1,710,749 A | * | 4/1929 | Svendsgaard | 56/13.6 |
| 1,816,246 A | * | 7/1931 | Herman | 30/392 |
| 2,455,840 A | * | 12/1948 | Stewart | 144/34.1 |
| 2,457,511 A | * | 12/1948 | Ware | 83/591 |
| 2,603,249 A | * | 7/1952 | Lawrence | 144/34.1 |
| 2,618,918 A | * | 11/1952 | Hansen | 56/10.4 |
| 2,725,704 A | * | 12/1955 | Skromme | 56/16.4 R |
| 2,729,044 A | * | 1/1956 | Dunn et al. | 56/10.6 |
| 2,732,675 A | * | 1/1956 | Smith et al. | 56/6 |
| 3,115,739 A | * | 12/1963 | Thoen et al. | 56/6 |
| 3,221,482 A | * | 12/1965 | Cowling | 56/15.8 |
| 3,236,037 A | | 2/1966 | Porterfield | |
| 3,274,762 A | * | 9/1966 | Jolls | 56/15.2 |
| 3,526,083 A | * | 9/1970 | Barry et al. | 56/10.7 |
| 3,824,772 A | * | 7/1974 | Sorenson et al. | 56/7 |
| 4,048,789 A | * | 9/1977 | Cartner | 56/11.9 |
| 4,170,099 A | | 10/1979 | Owens | |
| 4,183,195 A | * | 1/1980 | James | 56/11.9 |
| 4,206,580 A | * | 6/1980 | Truax et al. | 56/10.4 |
| 4,366,877 A | * | 1/1983 | Vissers et al. | 180/53.1 |
| 4,506,464 A | * | 3/1985 | Cartner | 37/91 |
| 4,629,006 A | * | 12/1986 | Mullet et al. | 172/15 |
| 4,642,976 A | | 2/1987 | Owens | |
| 4,663,920 A | | 5/1987 | Skovhoj | |
| 4,718,221 A | | 1/1988 | Wessel et al. | |
| 4,887,417 A | * | 12/1989 | Parsons, Jr. | 56/15.2 |
| 4,896,488 A | | 1/1990 | Duncan et al. | |
| 4,953,625 A | * | 9/1990 | Hurworth | 172/305 |
| 5,146,737 A | * | 9/1992 | Gantzer | 56/14.9 |

(Continued)

*Primary Examiner*—Thomas B Will
*Assistant Examiner*—Alicia Torres
(74) *Attorney, Agent, or Firm*—Boyle Fredrickson, S.C.

(57) ABSTRACT

The present invention is related to lawn maintenance and describes a system for mounting an accessory, such as a grass trimmer, to a riding lawnmower. The mounting system is simple, durable, and relatively inexpensive to manufacture and maintain, but provides a lawnmower operator the ability to operate an accessory while seated in the lawnmower. The mounting system is also advantageous in that the lawnmower operator need not specifically align the mower with any objects that present an obstacle for mowing, but may instead move the accessory to the object. The accessory mounting system comprises at least one link between a vertical pivot bar forming an axis for horizontal movement of the accessory and horizontal pivot point allowing vertical movement of the accessory.

19 Claims, 10 Drawing Sheets

U.S. PATENT DOCUMENTS

| | | |
|---|---|---|
| 5,167,108 A | 12/1992 | Bird |
| 5,226,284 A | 7/1993 | Meehleder |
| 5,598,689 A | 2/1997 | Bork |
| 5,694,752 A * | 12/1997 | Warfield, III ................. 56/13.6 |
| 5,725,230 A * | 3/1998 | Walkup ...................... 280/442 |
| 5,802,824 A | 9/1998 | Aldrich |
| 5,809,758 A | 9/1998 | Flanigan et al. |
| 5,960,614 A * | 10/1999 | Jones ........................ 56/15.2 |
| 6,094,896 A | 8/2000 | Lane |
| 6,098,719 A * | 8/2000 | Turner ........................ 172/307 |
| 6,105,354 A * | 8/2000 | Luhn et al. .................... 56/385 |
| 6,343,461 B1 | 2/2002 | Knott |
| 6,397,572 B1 | 6/2002 | Roundy et al. |
| 6,434,920 B1 | 8/2002 | Keane |
| 6,457,301 B1 | 10/2002 | Buss |
| 6,474,053 B1 | 11/2002 | Lund |
| 6,487,838 B2 | 12/2002 | Handlin |
| 6,516,597 B1 * | 2/2003 | Samejima et al. ............ 56/16.7 |

* cited by examiner

ACCESSORY MOUNTING SYSTEM FOR A RIDING LAWNMOWER

CROSS-REFERENCE TO RELATED APPLICATION

This application is related to provisional patent application Ser. No. 60/446,220, filed Feb. 10, 2003.

BACKGROUND OF THE INVENTION

1. Field of the Invention

The present invention relates to a system for mounting an accessory, such as a grass trimmer, to a riding lawnmower.

2. Discussion of the Related Art

In the field of lawn maintenance, a number of accessories may be needed in addition to a lawn mower to properly manicure a property. To prevent the mower operator from having to make multiple trips around the lawn after having mowed it, a variety of ways of combining lawn mowers with other accessories have been suggested. However, the prior art shows that attempts to mount accessories such as grass trimmers, edgers, and so forth to the mower have been insufficient in some respects. For the most part, where simple accessory mounting systems are suggested, the accessory is relatively rigidly mounted to the mower so that the mower operator is required to position the mower in order to position the accessory. Where the accessory is mounted in such a way as to grant a wider range of movement, the accessory mounting system often is mechanically complex and therefore susceptible to damage and expensive repairs. What is needed is an accessory mounting system that is simple, durable, and relatively inexpensive to manufacture and maintain, but that also provides the mower operator with a wide range of accessory positioning options that are relatively independent of the mower position.

SUMMARY OF THE INVENTION

A system for mounting a lawn care accessory to a lawnmower, tractor, or the like is disclosed. The accessory mounting system comprises at least one link between a vertical pivot member, forming an axis for horizontal movement of the accessory, and a horizontal pivot point allowing vertical movement of the accessory.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

Figure 1:
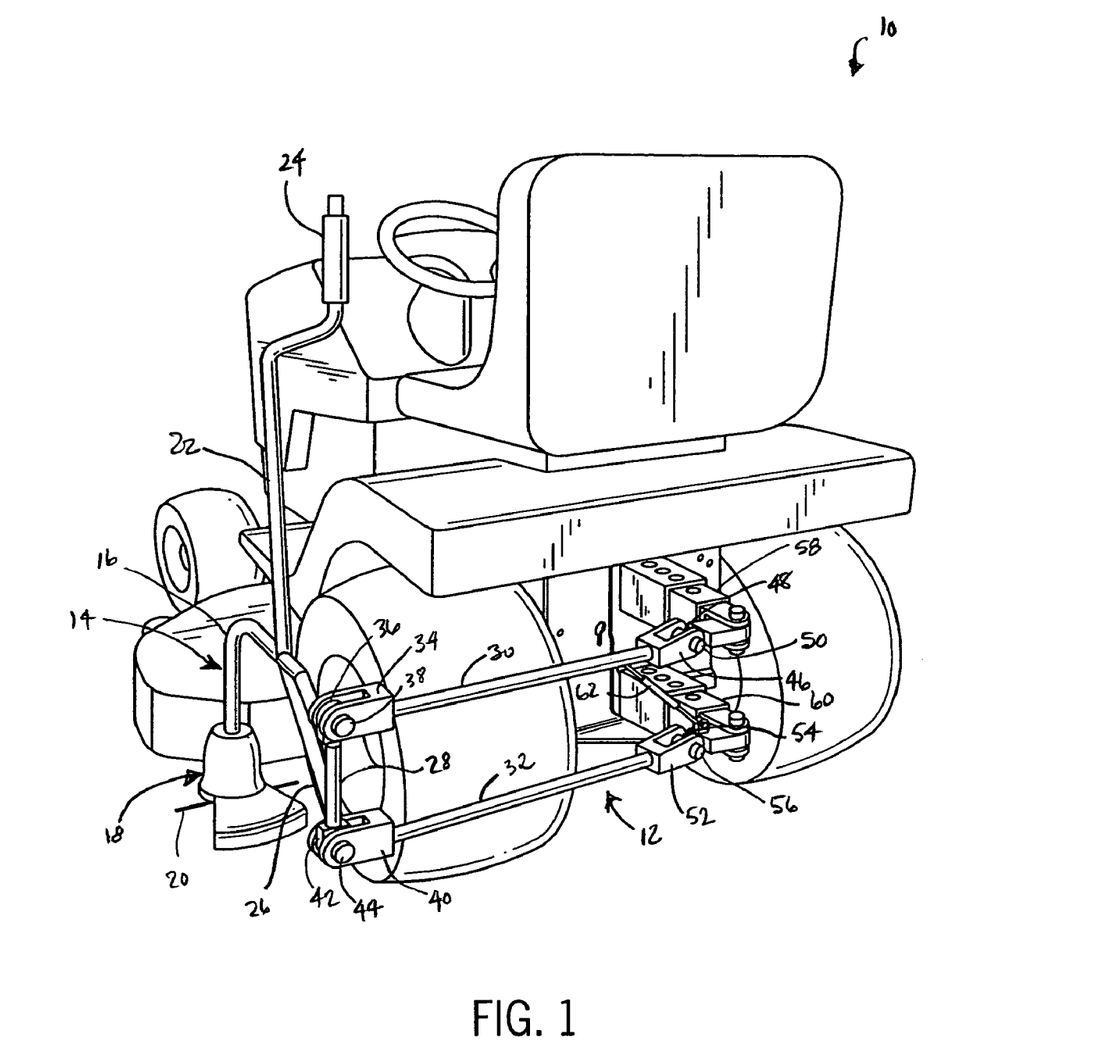
FIG. 1 is a perspective view of an embodiment of the present invention showing a vehicle such as a lawn tractor or mower with the accessory mounting system in a raised, retracted position.
Figure 2:
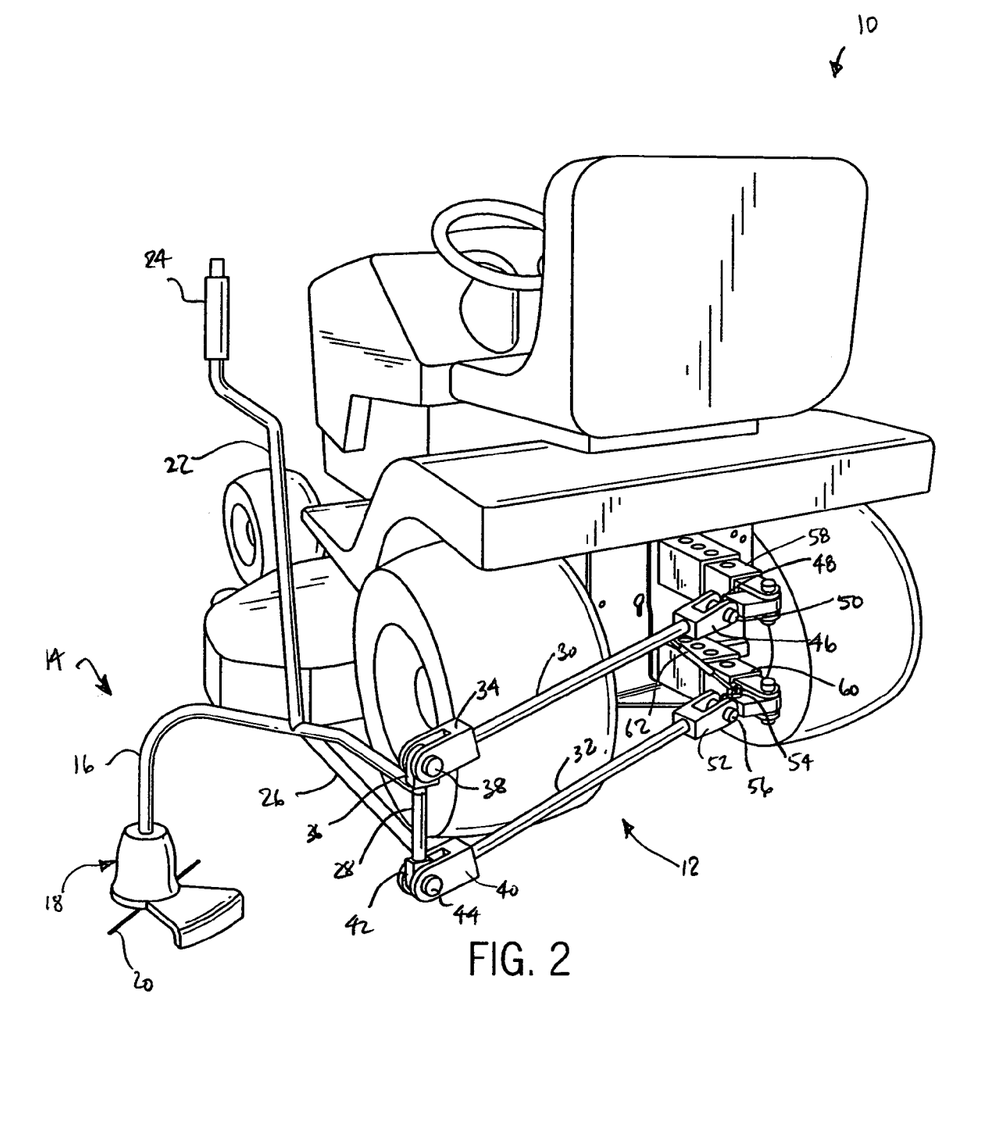
FIG. 2 is identical to FIG. 1 except that the accessory mounting system is shown in a lowered, extended position.

As can be seen in FIGS. 1 and 2, in a first embodiment of the invention, an accessory 14 is attached to a lawnmower 10 through a mounting system that includes a linkage 12. Linkage 12 enables movement of accessory 14 in both vertical and horizontal directions. In the illustrated embodiment, lawnmower 10 is a conventional riding lawnmower, and accessory 14 is a line trimmer. However, accessory 14 could be any conventional lawn care tool that may be mounted to lawnmower 10. Further, lawnmower 10 need not be a riding mower, but could be replaced with a push-type lawnmower or a tractor.

Still looking at FIGS. 1 and 2, trimmer accessory 14 has a shaft 16 that supports the trimmer head 18, which includes a trimmer line 20 in a known manner. A handle 22 is mounted at its lower end to a horizontal upper portion of shaft 16 so that handle 22 extends vertically upward from shaft 16. Handle 22 includes a handgrip 24 at its upper end, and further includes an on/off switch for controlling operation of trimmer accessory 14. The shaft 16 is supported by a brace 26, and both shaft 16 and brace 26 are connected to a vertical pivot bar 28.

The mounting system of the invention is in the form of a linkage 12 including an upper link member 30 and a lower link member 32. The upper link member 30 has an upper outer bracket 34 mounted to its outer end. The upper outer bracket 34 is generally U-shaped, and a pivot plate 36 is located between the spaced apart legs of upper outer bracket 34. Pivot plate 36 is pivotably mounted to upper outer bracket 34 by a pivot pin 38 that extends between the legs of upper outer bracket 34 and through an aligned opening formed in pivot plate 36. In a similar manner, the lower link member 32 has a lower outer bracket 40 mounted to its outer end. The lower outer bracket 40 is constructed similarly to upper outer bracket 34, and a pivot plate 42 is pivotably mounted to lower outer bracket 40 by a pivot pin 44. The vertical pivot bar 28 extends between the upper pivot plate 36 and the lower pivot plate 42, and is pivotable about a generally vertical pivot axis. Representatively, pivot bar 28 may be in the form of a vertical bar that extends between upper pivot plate 36 and lower pivot plate 42, together with a cylindrical sleeve defining a passage through which the vertical bar extends, such that the cylindrical sleeve is pivotable about a vertical pivot axis defined by the vertical bar. Brace 26 and the inner end of shaft 16 are mounted to the cylindrical sleeve, to enable horizontal movement of the handle 22, shaft 16 and trimmer head 18.

To provide the trimmer head 18 with movement in the vertical direction, upper link member 30 is connected to an upper inner bracket 46, which contains an upper clevis 48 secured by a pivot pin 50. In a similar manner, the lower link member 32 is connected to a lower inner bracket 52, which contains a lower clevis 54 secured by a pivot pin 56.

The linkage 12 may be mounted to a lawnmower 10 by attaching upper clevis 48 and lower clevis 54 respectively to upper 58 and lower 60 rear hitch members of lawnmower 10 in a known manner. Upper clevis 48 and lower clevis 54 are mounted to upper and lower hitch receivers, respectively, of lawnmower 10 via vertically aligned pivot pins. This allows for additional horizontal movement of the trimmer head 18, in that a first vertical axis of rotation for trimmer head 14 relative to linkage 12 is defined by pivot bar 28, and a second vertical axis of rotation for linkage 12 is defined by the aligned hitch receiver mounting pins. This provides articulated movement in a horizontal direction, which significantly increases the range and flexibility of movement of trimmer 14.

Referring now to FIGS. 7-10, a second embodiment is shown in which the linkage 12 is mounted to lawnmower 10 at another location. Although a variety of ways of mounting the linkage 12 to another location are possible, the illustrated embodiment shows a pair of bars having clevis ends 48, 54 extending from the right side of the body of mower 10. These could be integrally formed or attached in any suitable fashion and could be connected with any side of mower 10.

Figure 7:
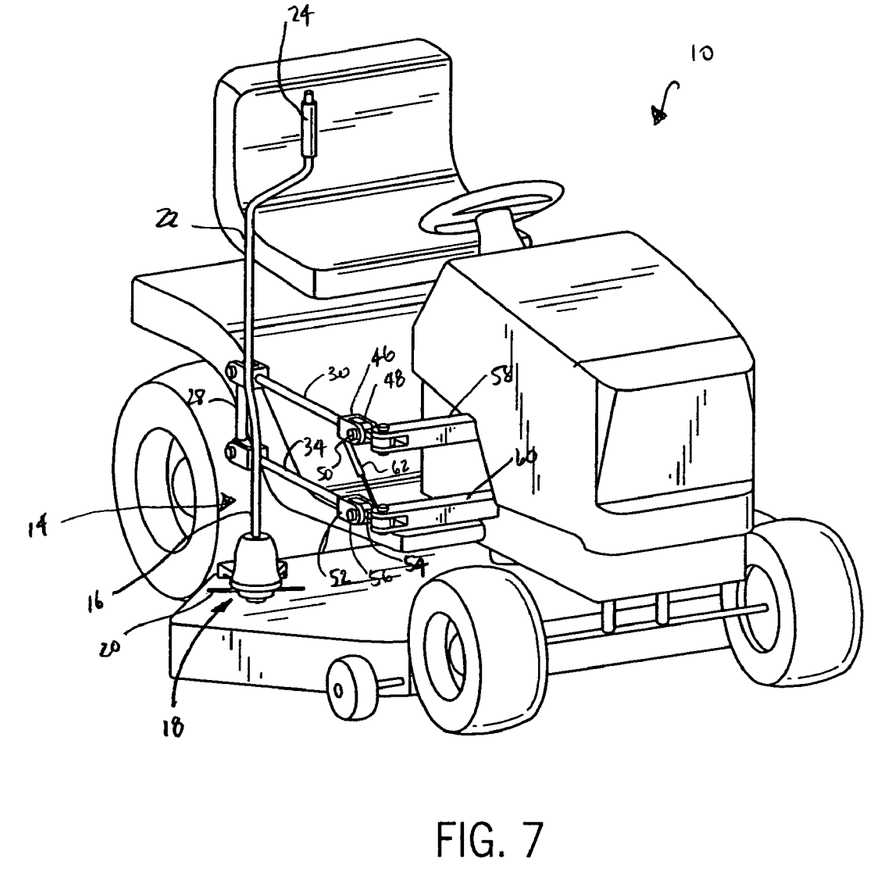
FIG. 7 is a perspective view of another embodiment of the present invention in which the accessory mounting system is located on the side of the lawnmower.
Figure 8:
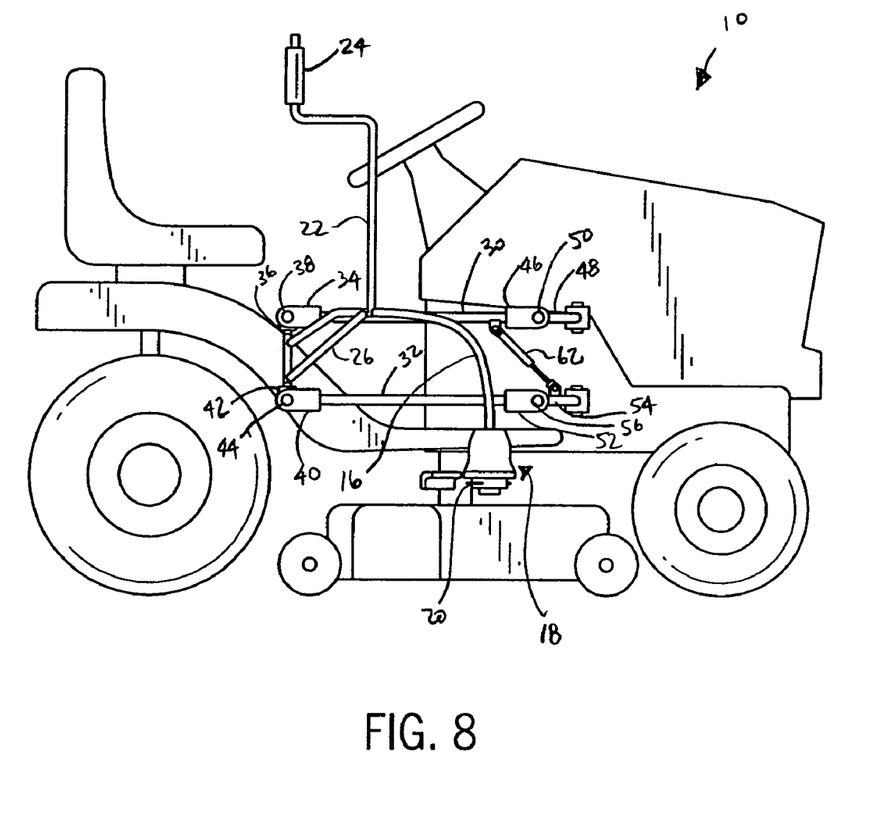
FIG. 8 is a side view of the embodiment shown in FIG. 7.
Figure 9:
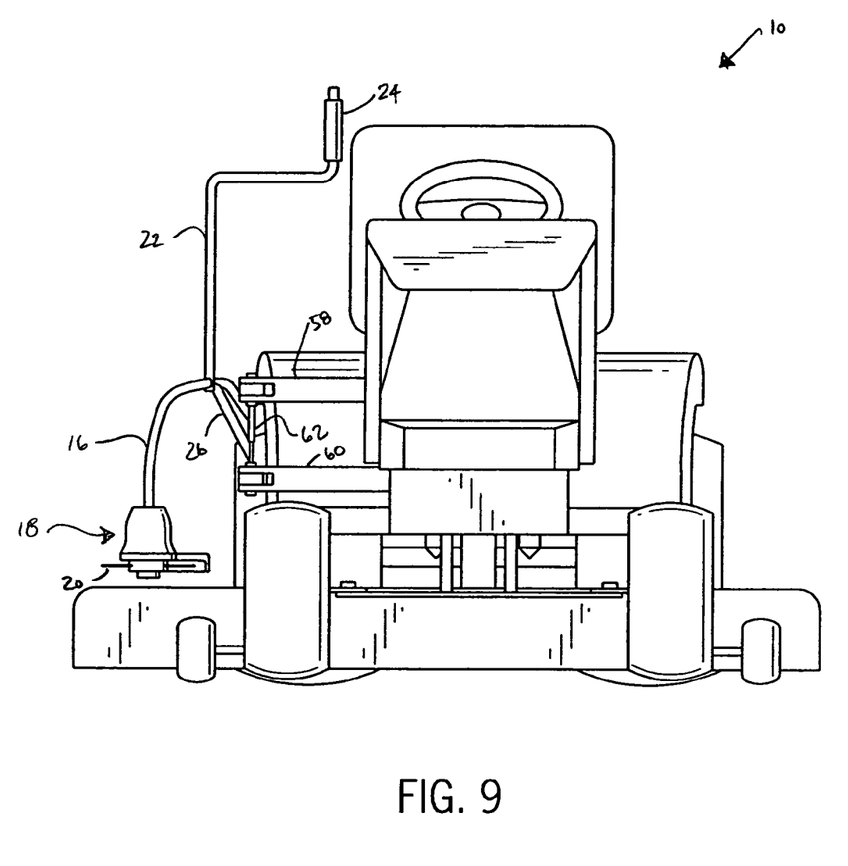
FIG. 9 is a front view of the embodiment shown in FIG. 7.
Figure 10:
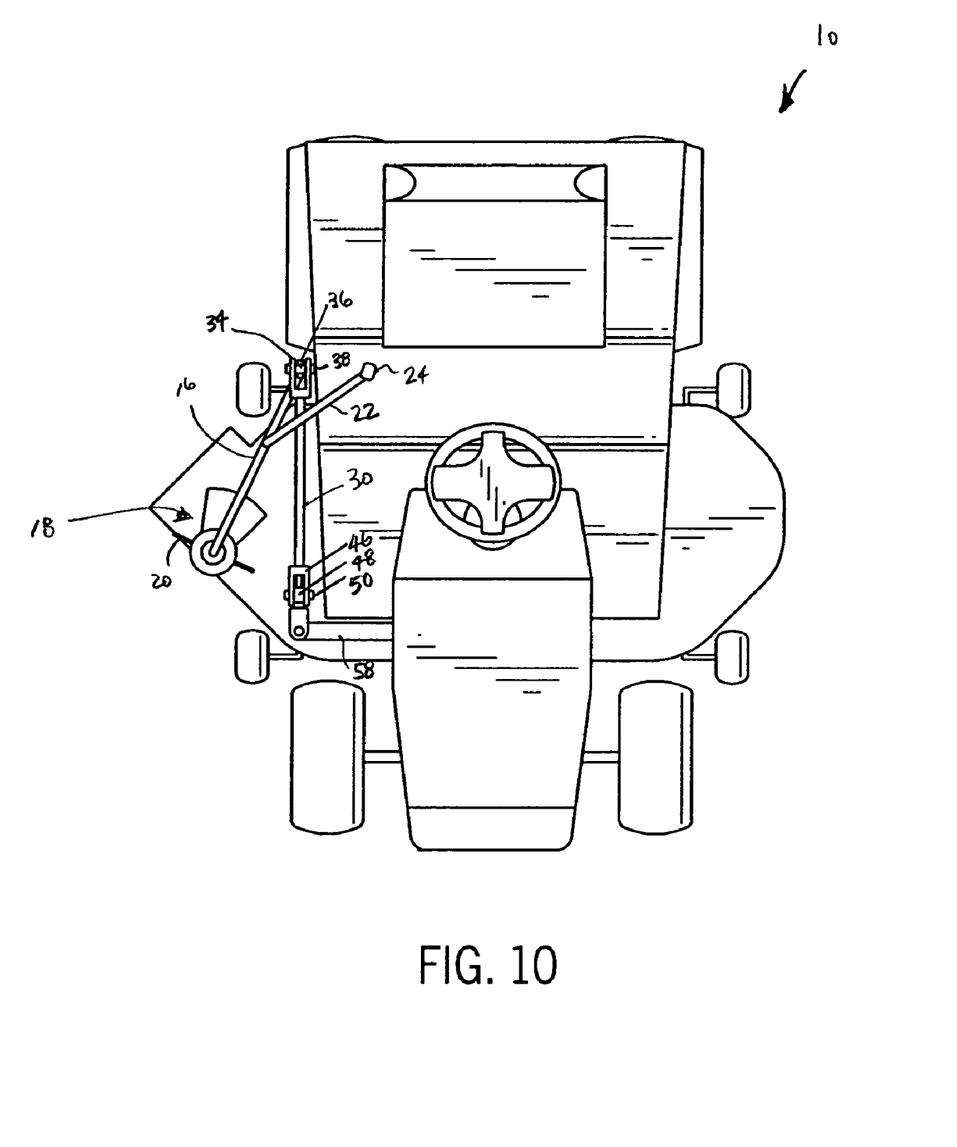
FIG. 10 is a top view of the embodiment shown in FIG. 7.

A biasing member 62 is attached between the upper link member 30 and the lower clevis 54. Biasing member 62 is present in each of the embodiments, but is best seen in FIGS. 7 and 8. Biasing member 62 functions to counterbalance the weight of the outer linkage and trimmer components, to bias the trimmer 14 to a raised, inoperative position, and to enable a user to easily lower the trimmer 14 against the biasing force provided by biasing member 62. In the illustrated embodiments, biasing member 62 is a gas spring cylinder although it is understood that any other suitable biasing arrangement may be employed.

Figure 3:
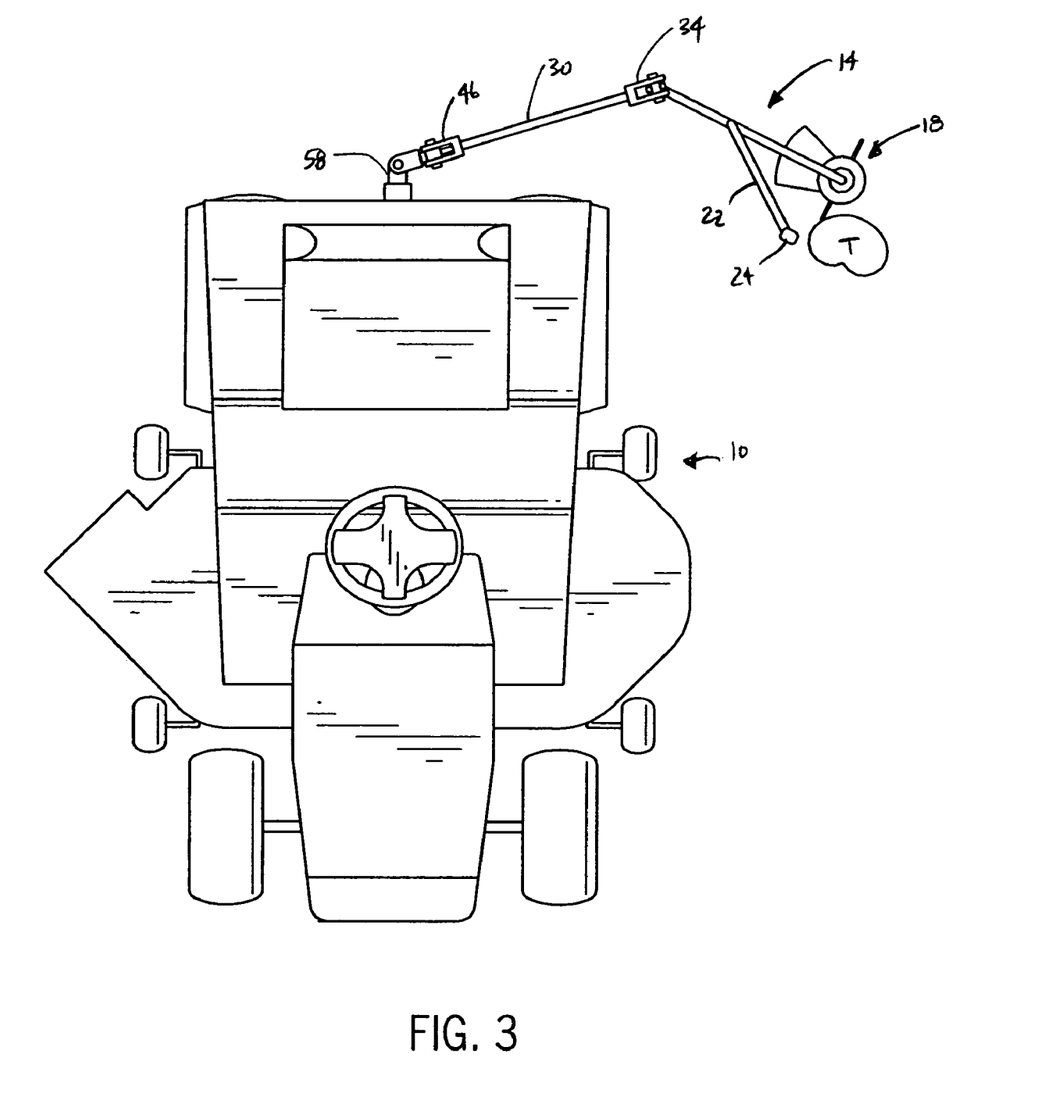
FIG. 3 is a top view of an embodiment of the present invention showing the accessory mounting system in an extended position adjacent the rear of an object, such as a tree, as the lawn tractor or mower approaches the object during forward movement.
Figure 4:
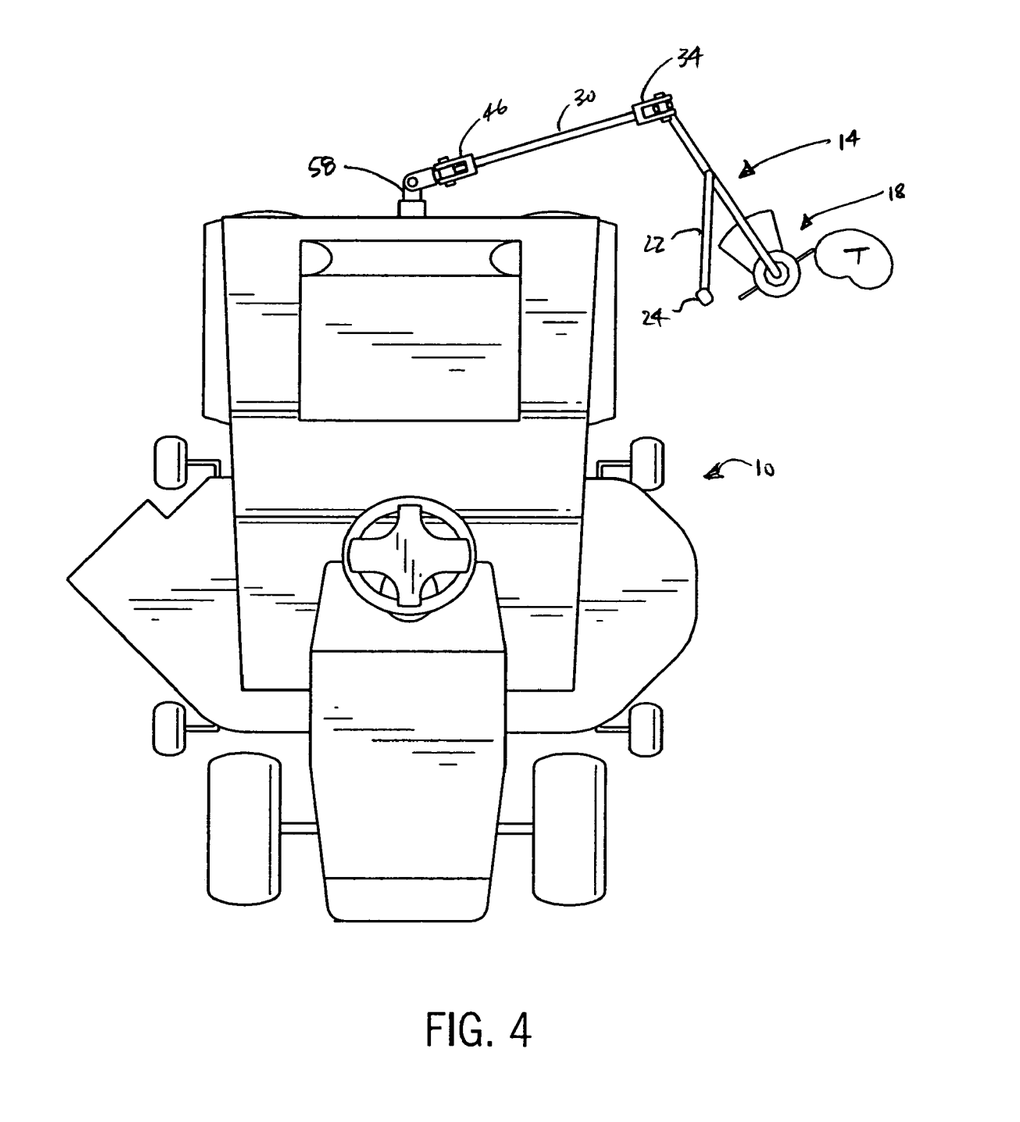
FIG. 4 is a top view of an embodiment of the present invention showing the accessory mounting system in an extended position adjacent the side of the object.
Figure 5:
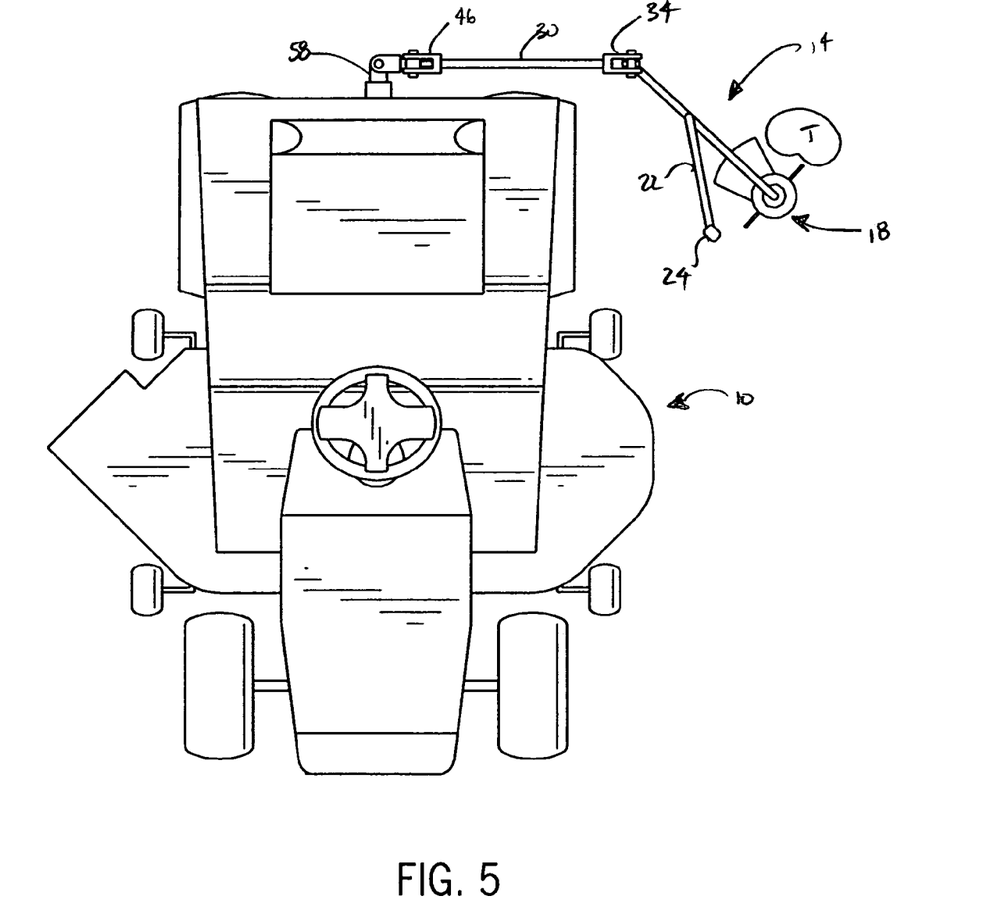
FIG. 5 is a top view similar to FIGS. 3 and 4 except showing the accessory mounting system in an extended position adjacent the front of the object.

Referring now to FIG. 3, in use and operation, trimmer 14 is retracted while the mower operator cuts grass with mower 10. When the operator approaches a tree T or other object, he or she grasps handgrip 24 of handle 22 to move trimmer head 18 of trimmer 14 near to tree T. The operator exerts a downward force, which allows handle 22, shaft 16, brace 26, and trimmer head 18 to pivot downwards from the upper 48 and lower 54 clevis and into an operative position.

Figure 6:
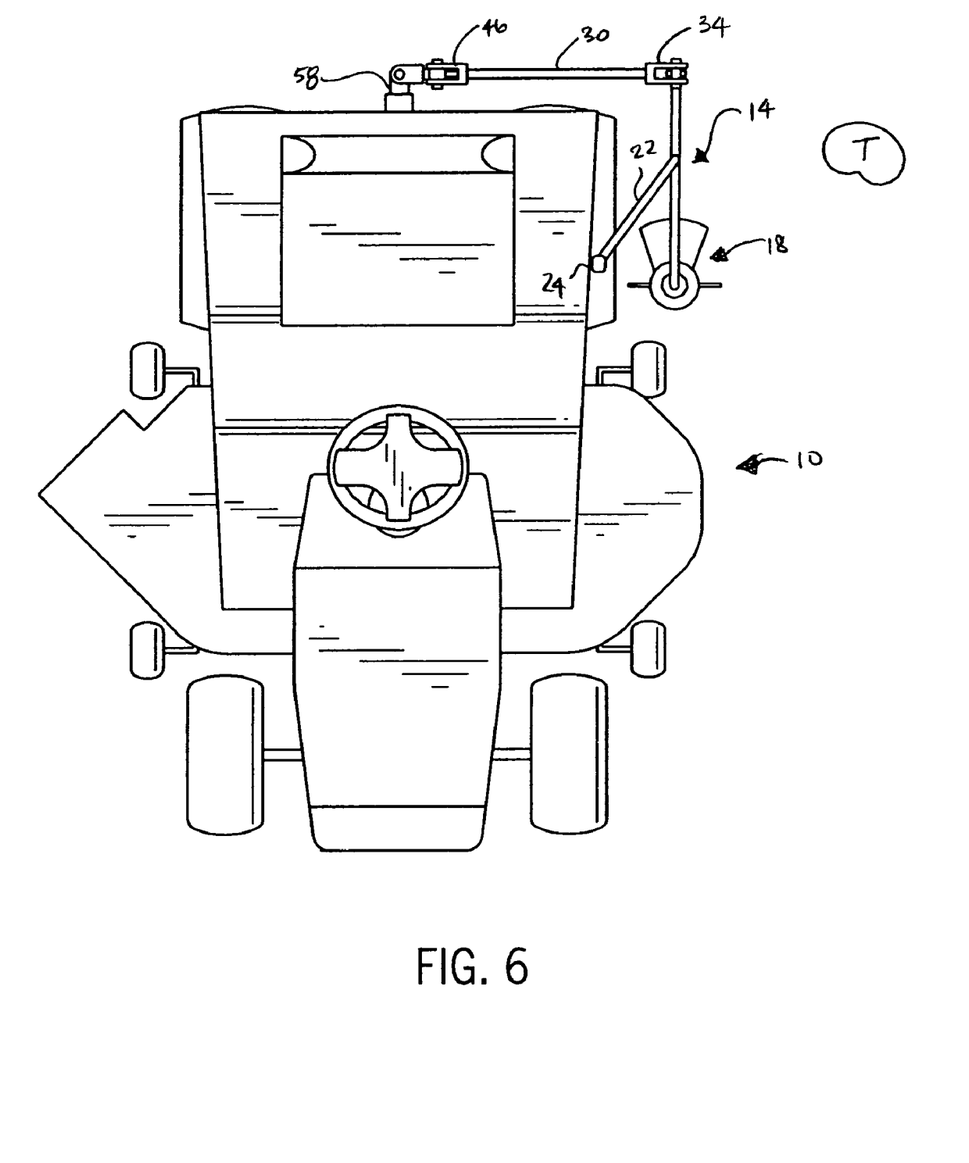
FIG. 6 is a top view similar to FIGS. 4 and 5, but showing the accessory mounting system in the raised, retracted position after trimming around the object as in FIGS. 3-5.

Trimmer head 18 can be laterally maneuvered close to tree T through a force applied to handle 22 by the operator in a horizontal direction. Upon application of an outward force in this manner, handle 22, shaft 16, brace 26, and trimmer head 18 pivot horizontally on vertical pivot bar 28. Linkage 12 pivots on the aligned hitch mounting pivot pins to provide a second vertical pivot axis for trimmer head 18, which increases the range of movement of trimmer head 18. The construction of linkage 12 functions to maintain trimmer head 18 parallel to the ground during use. In addition, the central mounting of linkage 12 relative to lawnmower 10 enables trimmer head 18 to be moved to the opposite side of lawnmower 10, which enables a user to trim about objects on either side of lawnmower 10 during use. When the task has been completed, the user releases the downward force on the handgrip 24, and biasing member 62 returns the trimmer 14 and linkage 12 to a raised, inoperative position. The user then returns trimmer 14 and linkage 12 to the retracted position as shown in FIG. 6.

Shaft 16 is configured to provide an open area between brace 26 and the vertical portion of shaft 16 to which trimmer head 18 is connected, to enable trimmer head 18 to be maneuvered about objects during operation.

Pivot bar 28 may include a torsion spring or the like for biasing trimmer 14 inwardly to a retracted position toward lawnmower 10. Likewise, the vertically aligned hitch mounting pins may also include a torsion spring arrangement or the like, for biasing linkage 12 forwardly to a retracted position toward lawnmower 10. In each case, a detent may be provided for releasably maintaining the trimmer 14 and linkage 12 toward the retracted position.

During operation, the articulated construction of the mounting system of the present invention prevents trimmer 14 and the mounting system from being damaged in the event trimmer 14 or trimmer head 18 strikes an object during movement of lawnmower 10. The pivotable mounting of linkage 12 to lawnmower 10 and the pivotable mounting of trimmer 14 to linkage 12 allows the unit to fold up or swing out of the path of the object when an object is encountered during movement and operation.

It is contemplated that trimmer 14 may be powered from the battery or any other satisfactory connection to the electrical system of lawnmower 10. It is also contemplated that trimmer 14 may be powered by a gasoline engine or in any other satisfactory manner. Trimmer head 18 may have an automatic line feed or a manual line feed in which line is advanced using a bump-type motion, in a manner as is known. In addition, while trimmer 14 is shown as a line-type trimmer, it is also understood that trimmer 14 may also be of the type that utilizes blades or other means for trimming.

While trimmer 14 is shown and described as being manually operated, it is also contemplated that pneumatic or hydraulic cylinders may be interconnected with linkage 12 and trimmer 14, which would be operable to control the position of trimmer head 18 via a controller such as a joystick or the like.

It is further contemplated that various other types of lawn care accessories or equipment may be mounted to lawnmower 10 using the linkage arrangement of the present invention. In addition, it is understood that the mounting system of the present invention may be used to mount any type of accessory to any type of moving vehicle, and is not limited to use in combination with a riding lawnmower. Further, it is understood that various other arrangements may be employed for linking a lawn care accessory to a riding lawnmower to allow for vertical and horizontal movement of the accessory by varying the position of the handgrip.

Various alternatives and modifications are contemplated as being within the scope of the following claims particularly pointing out and distinctly claiming the subject matter regarded as the invention.

I claim:

1. A system for mounting an accessory to a vehicle, comprising:
   a linkage arrangement interconnected with the vehicle, wherein the linkage arrangement includes a pair of vertically spaced link members, wherein each link member defines an inner end and an outer end, wherein the outer ends of the link members are vertically spaced apart from each other;
   a vertical pivot member mounted between the spaced apart outer ends of the link members, wherein the vertical pivot member defines a vertical pivot axis;
   an accessory interconnected with the vertical pivot member so as to be suspended from the ground and supported solely by the linkage arrangement, wherein the accessory defines a working end including a power unit that is spaced outwardly from the vertical pivot axis and is movable about the vertical pivot axis for movement between a first position and a second position relative to the linkage arrangement, wherein the working end of the accessory, including the power unit, is located on a first side of the linkage arrangement when the accessory is in the first position and is located on a second side of the linkage arrangement, opposite the first side, when the accessory is in the second position, wherein the accessory is operated by the power unit without being operated by drive components located inwardly of the vertical pivot member;

wherein the accessory is interconnected with the vertical pivot member via an accessory mounting arrangement defining an inner end interconnected with the vertical pivot member and an outer end to which the accessory is secured, wherein the accessory is located outwardly of the vertical pivot axis;

a linkage mounting arrangement interposed between the inner ends of the link members and the vehicle, wherein the linkage mounting arrangement defines a horizontal axis pivot connection to which the inner end of each link member is secured; and a manually operated handle interconnected with the accessory mounting arrangement at a location outwardly of the vertical pivot member, wherein the handle is configured to be raised and lowered to pivot the link members about the horizontal axis pivot connection, and to be moved horizontally to pivot the accessory mounting arrangement about the vertical pivot axis;

wherein pivoting movement of the link members about the horizontal axis pivot connection provides vertical movement of the link members and the vertical pivot member, and thereby the working end of the accessory, relative to the vehicle between a raised position and a lowered position.

2. The system of claim 1, wherein the linkage mounting arrangement is constructed and arranged to enable the linkage arrangement and the accessory to be moved about the vertical pivot axis to either a first side of the vehicle or a second side of the vehicle.

3. The system of claim 1, wherein the linkage mounting arrangement includes upper and lower mounting brackets interconnected with the vehicle, and vertically oriented pivot pins that pivotably mount the link members to the upper and lower mounting brackets for movement about the vertical pivot axis.

4. The system of claim 3, wherein the linkage mounting arrangement includes upper and lower mounting plates pivotably secured to the upper and lower mounting brackets, respectively, via the vertically oriented pivot pins, and wherein each link member is secured to one of the mounting plates via a horizontally oriented pivot pin that provides vertical pivoting movement of the link member relative to one of the upper and lower mounting brackets.

5. The system of claim 1, wherein the vertical pivot member comprises a vertical pivot bar that extends between and interconnects the outer ends of the link members.

6. The system of claim 1, wherein the linkage mounting arrangement is mounted to the rear of the vehicle.

7. The system of claim 1, wherein the linkage mounting arrangement is mounted to a side of the vehicle.

8. The system of claim 1, wherein the linkage arrangement includes a biasing arrangement for resiliently biasing the linkage arrangement toward the raised position.

9. The system of claim 8, wherein the biasing arrangement includes a biasing member interconnected between the linkage mounting arrangement and one of the link members, wherein the biasing member is configured to resiliently bias the linkage arrangement toward the raised position.

10. A system for mounting an accessory to a vehicle, comprising:

a linkage including a first link member and a second link member, wherein the first and second link members are vertically spaced apart and wherein each link member defines an inner end and an outer end, and wherein the link member inner ends are vertically spaced apart from each other and the link member outer ends are vertically spaced apart from each other;

a linkage mounting arrangement interconnected with the vehicle, wherein the inner end of each link member is connected to the linkage mounting arrangement, wherein the linkage mounting arrangement defines a first, vertical pivot axis and a second, horizontal pivot axis, wherein the first and second pivot axes are defined by first and second pivot members, respectively;

a vertical pivot member mounted between the spaced apart outer ends of the link members, wherein the vertical pivot member defines a third, vertical pivot axis, wherein the accessory is mountable to the vertical pivot member for connection to the vehicle through the first and second link members and the linkage mounting arrangement, wherein the accessory defines a working end including a power unit that is spaced outwardly from the third, vertical pivot axis and is movable about the third, vertical pivot axis for movement between a first position and a second position relative to the linkage, wherein the working end of the accessory, including the power unit, is located on a first side of the linkage when the accessory is in the first position and is located on a second side of the linkage, opposite the first side, when the accessory is in the second position, wherein the accessory is operated by the power unit without being operated by drive components located inwardly of the first, vertical pivot axis;

wherein the accessory is interconnected with the vertical pivot member via an accessory mounting arrangement defining an inner end interconnected with the vertical pivot member and an outer end to which the accessory is secured, wherein the working end of the accessory is located outwardly of the accessory mounting arrangement;

a manually operated handle interconnected with the accessory mounting arrangement at a location outwardly of the vertical pivot member, wherein the handle is configured to be raised and lowered to pivot the link members about the second, horizontal pivot axis, and to be moved horizontally to pivot the accessory mounting arrangement about the third, vertical pivot axis; and a biasing member, interconnected between the linkage mounting arrangement and one of the link members, for resiliently biasing the linkage toward a raised position about the second, horizontal pivot axis.

11. The system of claim 10, wherein the inner ends of the first and second link members are connected to respective first and second pivot plates, and wherein the second, horizontal pivot axis is defined by vertically aligned pivot pins forming a part of the linkage mounting arrangement, wherein the vertically aligned pivot pins extend through openings in the first and second pivot plates.

12. The system of claim 1, wherein the linkage mounting arrangement includes a vertical axis pivot connection to which the inner end of each link member is secured, wherein the vertical axis pivot connection provides pivoting movement of the link members about a second vertical pivot axis spaced inwardly from the first-mentioned vertical pivot axis.

13. The system of claim 10, wherein the accessory is mountable to the vertical pivot member via an accessory mounting arrangement that is pivotable about the third, vertical pivot axis defined by the vertical pivot member.

14. The system of claim 1, further comprising a brace that supports the handle and the accessory on the vertical pivot member.

15. The system of claim 9, wherein the biasing member comprises a gas spring cylinder.

16. The system of claim 10, further comprising a manually operated handle that can be raised and lowered to pivot the link members about the horizontal axis.

17. The system of claim 16, further comprising a brace that supports the handle on the vertical pivot member.

18. The system of claim 17, wherein the brace is also configured to support the accessory on the vertical pivot member so as to be suspended from the ground and supported solely by the linkage.

19. The system of claim 10, wherein the biasing member comprises a gas spring cylinder.

* * * * *